United States Patent Office 3,391,204
Patented July 2, 1968

3,391,204
METHOD OF PREPARING HALOGENATED HYDROCARBONS
David M. Young, Sarnia, Ontario, Canada, assignor to The Dow Chemical Company, Midland, Mich., a corporation of Delaware
No Drawing. Filed Mar. 10, 1967, Ser. No. 662,104
20 Claims. (Cl. 260—653)

ABSTRACT OF THE DISCLOSURE

Halogen is abstracted from compounds of a particular subclass of halogenated alkanes by bringing the halogeneoalkane into reactive relationship, as by contacting in the liquid phase, with an amine having a $pK_a$ value above 5.2, e.g., mono-, di- and triethanolamines, mono-, di- and trimethylamines, di- and triethylamines, di-n-propylamine, piperidine, morpholine and hydrazine. The invention provides, for instance, perchloroethylene as the major product from hexachloroethane, and monohydrogen alkanes and/or a perhalogenoalkene from certain other perhalogenoalkanes; for example, 1,1,2-trichlorofluoroethane yields $CClF_2 \cdot CHClF$ and, also, $CClF{=}CCl_2$.

The reaction is effected in the presence or absence of a catalyst, but advantages generally result from the use of a catalyst, e.g., a varivalent metal or a salt thereof, preferably copper or a copper salt.

---

This application is a continuation-in-part of my copending application Ser. No. 334,574, filed Dec. 30, 1963, assigned to the same assignee as the present invention, and now abandoned.

This invention relates broadly to a method of preparing halogenated hydrocarbons and, more particularly, halogenated hydrocarbons derived from other halogenated compounds. Still more particularly the invention is concerned with a new and improved method of abstracting halogen from compounds of a particular subclass of halogenated alkanes whereby there can be obtained, for example, perchloroethylene as the major product from hexachloroethane, and monohydrogen halogenoalkanes and/or a perhalogenoalkene from certain other perhalogenoalkanes.

The halogenoalkanes used as a starting reactant in practicing the invention claimed herein may be represented by the formula I 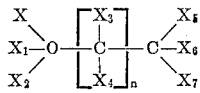

wherein X, $X_1$, $X_2$, $X_3$, $X_4$, and $X_5$ each represent a substituent selected from the group consisting of chlorine, bromine and fluorine atoms and perchloromethyl, perfluoromethyl and bromomethyl radicals, the total number of carbon atoms in the said halogenoalkane being not more than four (more specifically not more than two), the bromine atoms when present in the substituents represented by the various X's being not more than two atoms thereof, specifically one atom thereof, on any one carbon atom and, when bromine is absent from the aforesaid substituents, the total halogen is comprised of at least two chlorine atoms and the remainder fluorine atoms.

The halogenoalkanes embraced by Formula I are member of the broader class of halogenoalkanes disclosed in my aforementioned copending application Ser. No. 334,574 application as starting reactants contemplated for use in a reaction with an amine having a $pK_a$ value above 5.2 by bringing the halogenoalkane and the said amine into reactive relationship, as by contacting in the liquid phase, and whereby hydrogen is abstracted from the halogenoalkane. The aforesaid broader class of halogenoalkanes may be represented by the formula I-A 

wherein X, $X_3$, $X_4$ and $X_5$ each represent a substituent selected from the group consisting of chlorine, bromine and fluorine atoms and perchloroalkyl, perfluoroalkyl and bromoalkyl radicals, $X_1$, $X_2$, $X_6$ and $X_7$ have the same meanings as X, $X_3$, $X_4$ and $X_5$ and, in addition, an aryl radical, and $n$ represents an integer from 0 to 8, inclusive, the bromine atoms when present in the substituents represented by the various X's being not more than two atoms thereof on any one carbon atom and, when bromine is absent from the aforesaid substituents, the total halogen is comprised of at least two chlorine atoms and the remainder fluorine atoms. Of the compounds embraced by Formula I-A preferably not more than one of the radicals represented by $X_1$, $X_2$, $X_6$ and $X_7$ is an aryl radical.

Illustrative examples of halogenoalkanes embraced by Formula I and by the broader Formula I-A will be given hereafter.

Briefly described, the method of the invention claimed herein comprises bringing into reactive relationship, more particularly in the liquid phase, (1) a halogenoalkane of the kind embraced by Formula I and (2) an amine (i.e., a compound containing at least one amino group) having a $pK_a$ value above 5.2, more particularly at least about 7.0, e.g., an alkylamine such as mono-, di- or trimethyl or triethylamines, an alkanolamine such as mono-, di- or triethanolamines, or a cyclic amine such as morpholine.

The present invention is particularly useful and valuable in converting hexachloroethane (HCE) to perchloroethylene (PCE). Prior methods of producing PCE have involved, for example, pyrolysis of HCE at 300°–600° C. and whereby $CCl_4$ is a by-product of the reaction unless technique is employed to remove by-product chlorine as it is formed. Other proposed methods have included reduction of HCE to PCE by catalytic hydrogenation over nickel at 270° C.; by treatment with alcoholic potassium hydrogen sulfide; by heating at 280° C. with silver; by reaction with sodium hydroxide in absolute alcohol; by heating to 140° C. with alcohol-free sodium ethoxide in ether; by reduction with zinc; by reacting HCE photochemically or thermally with methanol; by reaction of tributyl phosphate with HCE; and by reacting paraffinic hydrocarbons with HCE in the presence of peroxides at about 120° C. to give PCE and the corresponding monochloroparaffin.

The principal disadvantages of the pyrolysis route in producing PCE from HCE are the high temperatures (about 600° C.) required for reasonably fast conversion, as well as corrosion problems and the fact that two moles of $CCl_4$ are formed for every mole of PCE made.

In marked contrast to the prior art methods of making PCE from HCE, no appreciable amount of $CCl_4$ is formed by the method of this invention but primarly PCE and trichloroethylene (TCE), both of which are valuable commercial products for which there is an increasing market demand. Such results (i.e., substantially no formation of $CCl_4$) are due to the fact that the present method involves two reactions, namely, reduction of —Cl to —H followed by elimination of HCl. These two reactions occur substantially concurrently. This was unobvious and wholly unexpected, and in no way could have been predicted from the teachings of the prior art.

Another advantage of this invention is that PCE and TCE can be produced from HCE at a relatively low temperature, and there are substantially no objectionable impurities, if any, present in the product.

The relatively low temperature (as compared with prior-art methods) employed in practicing the method of this invention is, in general, a characteristic feature and advantage. Additionally, relatively inexpensive amines or substances containing amines, e.g., triethanolamine and other alkanolamines, can be used as the amine reactant. Indeed, a further advantage of the instant method is that the purity of the amine reactant is unimportant; in fact, even crude amines or mixtures of amines can be employed satisfactorily.

In addition to the above-described preparation of PCE from HCE the present invention is also especially valuable in converting 1,1,2-trichloro-1,2,2-trifluoroethane to 1,2-dichloro-1,2,2-trifluoroethane, $CHClF \cdot CClF_2$. The known synthesis yielding the latter compound as the main product are illustrated by the following equations:

II

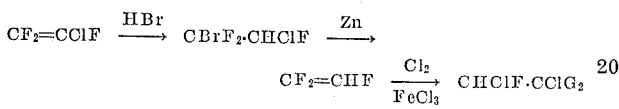

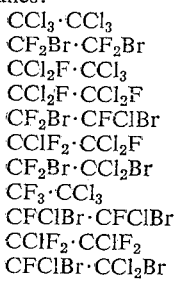

and

III

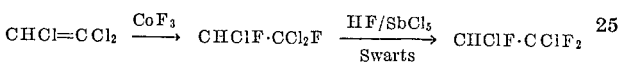

$CHClF \cdot CClF_2$ also has been obtained as a minor by-product from other preparations. For example, it has been obtained in very small amounts from the fluorination of pentachloroethane by the Swarts method; in low yield by the direct fluorination of trichloroethylene; and, as a by-product, in the reduction of $CCl_2F \cdot CClF_2$ with $H_2$ in an iron tube at 550°–600° C. to yield mainly chlorotrifluoroethylene, $CF_2=CClF$, plus small amounts of by-product $CF_2=CHF$ and $CHClF \cdot CClF_2$.

It will be noted that, although the methods illustrated by Equations II and III yield $CHClF \cdot CClF_2$ as a main product, there are several steps involved in the processes and the required reactants are relatively expensive. The remaining methods yield $CHClF \cdot CClF_2$ only as a minor by-product and are not economically feasible.

The method of the instant invention enables one to prepare, for example, $CHClF \cdot CClF_2$ directly from $CCl_2F \cdot CClF_2$, which is a readily available and relatively inexpensive reactant, in one simple step. The reaction conditions are very mild, posing no corrosion problems, and the reactants used are relatively inexpensive. As in the preparation of PCE from HCE, crude amines, e.g., crude triethanolamine and other crude alkanolamines, can be used in the process.

It was quite surprising and unobvious that a compound of the kind embraced by Formula I could have a halogen abstracted therefrom by reacting it with an amine having a $pK_a$ value above 5.2, particularly in view of the results obtained with such a closely related compound as, for example, $CF_3 \cdot CClF_2$ which was found not to react with such an amine, specifically triethanolamine. In marked contrast, halogenated compounds within the scope of Formula I react with the above-defined amines to yield, for instance, perchloroethylene as the major product when the starting halohydrocarbon is hexachloroethane; and a monohydrogen derivative in minor or major (usually major) amounts in other cases. Usually the monohydrogen compound is the only compound to which the halogenoalkane is reduced when the starting perhaloalkane is brought into reactive relationship with an amine having a $pK_a$ value above 5.2. The practical importance of these discoveries will be readily appreciated by those skilled in the art.

THE REACTANTS

The halogenoalkane reactant.—The reactants employed in practicing the invention claimed herein are those embraced by Formula I. Specific examples will be apparent to those skilled in the art from this formula, the definition thereof including the definitions of the various X's, and the following illustrative examples of the various perhalogenated ethanes, perhalogenated propanes and perhalogenated butanes within the scope of said formula:

Ethanes:
    $CCl_3 \cdot CCl_3$
    $CF_2Br \cdot CF_2Br$
    $CCl_2F \cdot CCl_3$
    $CCl_2F \cdot CCl_2F$
    $CF_2Br \cdot CFClBr$
    $CClF_2 \cdot CCl_2F$
    $CF_2Br \cdot CCl_2Br$
    $CF_3 \cdot CCl_3$
    $CFClBr \cdot CFClBr$
    $CClF_2 \cdot CClF_2$
    $CFClBr \cdot CCl_2Br$ Propanes:
    $CCl_3 \cdot CF_2 \cdot CCl_3$
    $CF_3 \cdot CBrCl \cdot CCl_2Br$
    $CF_3 \cdot CFBr \cdot CF_2Br$
    $CF_3 \cdot CCl_2 \cdot CCl_3$
    $CF_3 \cdot CBrCl \cdot CCl_2F$
    $CCl_3 \cdot CF_2 \cdot CF_2Cl$
    $CF_2Br \cdot CFBr \cdot CF_2Cl$
    $CF_2Br \cdot CBrCl \cdot CF_3$
    $CF_3 \cdot CBrCl \cdot CF_2Cl$
    $CF_2Cl \cdot CFCl \cdot CF_2Cl$
    $CF_2Br \cdot CF_2 \cdot CF_2Br$
    $CF_3 \cdot CFBr \cdot CF_2Br$
    $CF_3 \cdot CFBr \cdot CCl_2Br$
    $CCl_3 \cdot CCl_2 \cdot CCl_2F$
    $CFCl_2 \cdot CCl_2 \cdot CCl_2F$
    $CClF_2 \cdot CCl_2 \cdot CClF_2$
    $CF_3 \cdot CClF \cdot CCl_3$
    $CF_3 \cdot CFCl \cdot CCLF_2$ Butanes:
    $CF_3 \cdot CCl_2 \cdot CCl_2 \cdot CF_3$
    $CF_2Br \cdot CFBr \cdot CFCl \cdot CF_2Cl$
    $CF_2Cl \cdot CFCl \cdot CFCl \cdot CF_2Cl$
    $CF_3 \cdot CF_2 \cdot CF_2 \cdot CCl_3$
    $CF_2Cl \cdot CFCl \cdot CF_2 \cdot CF_3$
    $CF_2Cl \cdot CF_2 \cdot CF_2 \cdot CF_2Cl$
    $CF_3 \cdot CFCl \cdot CFClCF_3$
    $CF_3 \cdot CFBr \cdot CFBr \cdot CF_3$
    $(CF_3)_2CBr \cdot CF_2Br$
    $Br(CF_2)_4Br$
    $CCl_3 \cdot CF_2 \cdot CCl_2 \cdot CF_3$
    $CCl_3 \cdot CCl_2 \cdot CF_2 \cdot CCl_3$ Examples of subclasses of halogenoalkanes outside the scope of Formula I but which are embraced by the aforementioned broader class of halogenoalkanes represented by Formula I-A are, for instance, the perhalogenopentanes, -hexanes, -heptanes, -octanes, -nonanes, -decanes and aryl-substituted halogenoalkanes and which otherwise meet the specified requirements as to aryl groups when present, the positioning of bromine atoms when present and the constitution of the total halogen when bromine is absent. Specific examples of such perhalogeno compounds embraced by Formula I-A but outside the scope of Formula I follows:

Pentanes:
    $CF_3 \cdot CF_2 \cdot CFCl \cdot CF_2 \cdot CFCl_2$
    $CCl_3 \cdot CCl_2 \cdot CF_2 \cdot CCl_2 \cdot CCl_3$
    $CFClBr \cdot CF_2 \cdot CFCl \cdot CF_2 \cdot CCl_3$ Hexanes:
    $(CF_3)_2 \cdot CCl \cdot CCl(CF_3)_2$
    $CF_3 \cdot CClF \cdot CF_2 \cdot CF_2 \cdot CClF \cdot CF_3$
    $CF_2Cl(CF_2)_4CF_2Cl$
    $CF_3 \cdot (CF_2)_4CCl_3$
    $CF_2Cl(CFCl)_4CF_2Cl$
    $CCl_3 \cdot CF_2 \cdot CFCl \cdot CFCl \cdot CF_2 \cdot CCl_3$
    $CFCl_2(CFCl)_4CFCl_2$
    $C_2F_5 \cdot CFCl \cdot CFCl \cdot C_2F_5$ Octanes:
    $CF_2Cl(CFCl)_2(CF_2)_2(CFCl)_2CF_2Cl$
    $CF_2Cl(CFCl \cdot CF_2)_3 CFCl_2$
    $CF_2Cl \cdot CFCl \cdot CF_2 \cdot CFCl \cdot CFCl \cdot CF_2 \cdot CFCl \cdot CF_2Cl$
Decanes:
    $(CF_2Cl \cdot CF_2 \cdot CFCl \cdot CF_2 \cdot CFCl-)_2$
    $CF_2Cl(CF_2CFCl)_4 CFCl_2$
    $CFCl_2(CF_2CFCl)_4 CFCl_2$
    $CCl_3(CF_2CFCl)_4 CCl_3$
Aryl-substituted compounds:
    $C_6H_5CF_2 \cdot CFCl_2$
    $C_6H_5CF_2 \cdot CCl_3$
    $C_6H_5CFCl \cdot CF_2Cl$
    $C_6H_5CFCl \cdot CFCl_2$
    $C_6H_5CFCl \cdot CCl_3$
    $C_6H_5CCl_2 \cdot CF_3$
    $C_6H_5CCl_2 \cdot CF_2Cl$
    $C_6H_5CF(CF_2Cl)_2$ Other examples of halogenoalkanes within the scope of Formulas I and I-A will be found in the published literature.

The amine reactant.—This reactant, as stated hereinbefore, should be one having a $pK_a$ value above 5.2. Specific examples of useful amines meeting this requirement, and the published $pK_a$ values of all but morpholine, are given below:

| Amine: | $pK_a$ value |
|---|---|
| Methylamine (monomethylamine) | 10.64 |
| Dimethylamine | 10.70 |
| Diethylamine | 11.0 |
| Triethylamine | 10.72 |
| Isopropylamine | 12.05 |
| Di-n-propylamine | 10.91 |
| Piperidine | 11.12 |
| Morpholine | ---- |
| Monoethanolamine | 9.44 |
| Diethanolamine | 8.88 |
| Triethanolamine | 7.77 |
| Hydrazine | 8.48 |

Additional examples of amines having a $pK_a$ value above 5.2 will be found in the Handbook of Chemistry and Physics, 44th edition (1962–1963), published by the Chemical Rubber Publishing Company, Cleveland, Ohio.

Illustrative examples of amines that have been found to be inoperative in practicing the present invention are aniline and pyridine, the $pK_a$ values of which are 4.58 and 5.19, respectively. Ammonia also has been found to be inoperative in carrying the instant invention into effect.

CONDITIONS OF REACTION

The molar ratios of the halogenoalkane and amine reactants may be widely varied, e.g., within the range of from about 0.01 to about 3 or more moles of the amine reactant per mole of the halogenoalkane reactant. The use of molar ratios below about 2.0 moles of amine per mole of halogenoalkane, e.g., from about 0.01 to about 1 mole of amine per mole of halogenoalkane, may be especially advantageous when the reaction is carried out continuously and the unreacted halogenoalkane is recycled for further reaction. In general, when the molar ratio of amine per mole of halogenoalkane substantially exceeds about 2 moles of the former per mole of the latter, both the yield and the conversion decrease. Hence the excess amine is consumed and, therefore, wasted. Of course, if one wanted to operate without regard for optimum process efficiency or optimum yield of the desired end-product, one could use 5 moles or even 10 or more moles of amine reactant per mole of the halogenoalkane reactant. Good results have been obtained when the amine reactant and the halogenoalkane were used in the ratio of about 2 moles of the former per mole of the latter.

Temperature of reaction.—The temperature of the reaction is dependent upon the particular reactants employed and may range, for example, from about 0° C. to about 100°–120° C. or higher and, preferably, from about 20° C. to about 80° C. The temperature and/or pressure advantageously are such that the reaction mass is in liquid state during the course of the reaction.

Time of reaction.—The time of the reaction is not important since one may prefer to carry out the reaction for a relatively short period of time with a relatively low conversion rate, and to recycle the unreacted amine and the haloalkane, rather than to make the reaction go to completion without recycling the reactants. In general, the time of the reaction depends upon the particular reactants employed, the temperature of the reaction, the efficacy of the catalyst (if employed), and other influencing factors. In some cases, the reaction may go to completion almost immediately. In other cases, using low temperatures (e.g., 0°–5° C.), periods of a week or more may be required to obtain an appreciable amount of product.

Pressure of reaction.—The pressure of the reaction likewise is dependent primarily upon the particular reactants employed. Preferably the pressure is such that the reactants are maintained in a liquid phase during the course of the reaction. Thus it will be seen that the reaction may be carried out either at atmospheric pressure with certain reactants or at superatmospheric pressure when lower-boiling reactants are employed. The pressure of reaction seems to have no effect on the course of the reaction.

Use of a solvent or diluent.—The reaction may be effected in the presence or absence of an inert (substantially completely inert) liquid solvent or diluent. The reaction medium may contain up to a few percent of water but the reaction rate then tends to be slower. From a kinetic standpoint and practical considerations, e.g., stirring, it is preferable to have the amine, the halogenoalkane and the catalyst, if employed, in one phase. Some amine-halogenoalkane pairs are miscible when used in the preferred mole ratios. Others, e.g., the ethanolamines, are immiscible. In such cases it is advantageous, but not essential, to provide an inert, liquid solvent or diluent. Another advantage in the use of a solvent or diluent is that it helps to control the heat of the reaction.

By "inert" or "substantially completely inert," liquid, reaction medium is meant one which is so inert or non-reactive toward the reactants and the reaction product under the conditions of reaction that it will not adversely affect the course of the reaction or the constitution of the reaction product. By "liquid, reaction medium," "solvent," or "diluent," is meant one which is liquid under the reaction conditions, e.g., at the temperature and pressure employed in effecting the reaction. In other words, the inert, liquid, reaction medium (solvent or diluent) in which the reaction may be effected may or may not be liquid at ambient (room) temperature or at any other temperature below the reaction temperature. Preferably the liquid reaction medium, if employed, is one which is volatile (volatilizable) without decomposition.

Illustrative examples of inert, liquid solvents or diluents that may be employed are pentane, hexane, heptane, octane, nonane, decane, tetradecane, hexadecane and similar saturated aliphatic hydrocarbons or mixtures thereof; aromatic hydrocarbons, e.g., benzene, toluene, xylene, etc.; cyclic ethers, e.g., tetrahydrofuran, tetrahydro-2-methylfuran, m-dioxane (1,3-dioxane), p-dioxane (1,4-dioxane), pentamethylene oxide, etc.; the various aliphatic ethers, e.g., diethyl ether, dipropyl ether, dibutyl ether, diamyl ether, dihexyl ether, diheptyl ether, diglycoldimethyl ether, glycol monoethers such as glycol monomethyl, -ethyl, -propyl, -butyl and -benzyl ethers, etc.; alcohols, especially the lower saturated aliphatic monohydric alcohols, e.g., methyl through hexyl, inclusive (both normal and isomeric forms); ketones, e.g., acetone, diethyl ketone, methyl ethyl ketone, ethyl propyl ketone, propyl butyl ketone, dibutyl ketone, diamyl ketone, dihexyl ketone, etc.

Preferably a lower alkanol, specifically methanol, is used as the inert solvent because it is a useful "bridge"

solvent between water-soluble and organic-soluble compounds. Furthermore, it is inert in the reaction with which this invention is concerned, and its boiling point is low enough to provide effective control of the reaction temperature by reflux.

Use of a catalyst.—The reaction may be effected in the presence or absence of a catalyst for the reaction. The catalyst, in finely divided or other suitable state, may be a metal-containing (advantageously, in most cases, a varivalent metal-containing) catalyst, more particularly a copper-containing catalyst such as metallic (elementary) copper or a copper salt of an inorganic or organic acid, e.g., cuprous or cupric chloride, bromide, nitrate, acetate, propionate, etc.; or corresponding salts of silver, cobalt, tin, manganese, nickel, iron, molybdenum, chromium, antimony, vanadium and the like, or the said varivalent metals in elementary form, or alloys thereof with each other or with other metals. Preferably a copper-containing catalyst, specifically elementary copper in powder form or a cuprous or cupric salt is employed. In general, use of a catalyst comprised of, for example, one or more of the aforesaid metals or of inorganic or organic salts thereof gives higher conversions, shorter induction periods, lower operating temperatures and a wider choice of useful amines.

Isolation of product.—The product may be isolated by any suitable means from the reaction mass. Ordinarily the product is isolated by volatilization (distillation) from the reaction mass at atmospheric or sub-atmospheric pressure depending upon the particular boiling point of the reaction product. Another acceptable technique is to water-wash the crude product to remove unreacted amine and any water-soluble reaction products and by-products. Another way is to neutralize the reaction mass by shaking it with aqueous acid, e.g., acqueous HCl. The unreacted amine is thereby converted to amine hydrochloride which is much more soluble in water than in organic materials. If desired, one may combine all three techniques. For example, one may wash out the bulk of the water-soluble substances with pure water, then remove the last traces of unreacted amine by treatment with a dilute acid (e.g., dilute aqueous HCl), and finally remove the acid and acid salts by washing with pure water. The organic layer is then dried, and the desired product or products of the eraction are isolated, e.g., by distillation.

With further reference to the discussion under the heading "The Reactants," and specifically under the subheading "The Amine Reactant," it may be stated that the latter is preferably one having a $pK_a$ value at least as high as that of triethanolamine.

In order that those skilled in the art may better understand how the present invention can be carried into effect, the following examples are given by way of illustration and not by way of limitation. All parts and percentages are by weight unless otherwise stated.

Example 1

A stainless-steel bomb is charged with 118.4 parts of hexachloroethane, 450 parts of triethanolamine (TEA) and a trace of copper powder. The mixture is heated at 85°–105° C. for two hours with vigorous agitation. When cool, the contents of the bomb are diluted with water and steam distilled. There is obtained 72.8 parts of a heavy, colorless, liquid which is found by gas chromatographic analysis to obtain:

| | | |
|---|---|---|
| Perchloroethylene | percent | 95.3 |
| Trichloroethylene | do | 4.7 |
| Chloroform | p.p.m. | About 50 |
| Vinylidene chloride | p.p.m. | About 50 |

No other compounds are detected. The yields of perchloroethylene and trichloroethylene are, therefore, 83.7% and 4.1% respectively, based on hexachloroethane.

Example 2

A 3-necked reaction vessel fitted with a stirrer and a reflux condenser is charged with 165.2 parts of hexachloroethane, 432.1 parts of crude triethanolamine (approximately 45% triethanolamine), representing a molar ratio of triethanolamine to hexachloroethane of 1.86:1, and a trace of copper powder. The mixture is heated at 100° C. for two hours with stirring. When cool, the contents of the vessel are diluted with water and steam distilled. There is obtained 78.0 parts of a heavy, slightly yellow liquid which is found by gas-chromatographic analysis to contain 91.2% perchloroethylene and 8.8% trichloroethylene. The yields of perchloroethylene and trichloroethylene are, therefore, 61.3% and 7.5%, respectively, based on hexachloroethane.

Example 3

Same as in Example 2 with the exception that the copper catalyst is omitted and a larger molar amount of triethanolamine is used. The reaction vessel is charged with 98.2 parts of hexachloroethane and 575.0 parts of crude triethanolamine (45% triethanolamine), representing a molar ratio of triethanolamine to hexachloroethane of 4.18 to 1. There is obtained 58.6 parts of product which is found to contain 82.9% perchloroethylene and 17.1% trichloroethylene. The yields of perchloroethylene and trichloroethylene are, therefore, 71.0% and 18.6%, respectively, based on hexachloroethane.

Example 4

Same as in Example 2 with the exception that a smaller molar amount of triethanolamine is employed. The vessel is charged with 97.0 parts of hexachloroethane, 134.3 parts of crude triethanolamine (45% triethanolamine), representing a molar ratio of triethanolamine to hexachloroethane of 0.99:1, and a trace of copper powder. There is obtained 50.4 parts of product which is found to contain 90.75% perchloroethylene and 9.25% trichloroethylene. The yields of perchloroethylene and trichloroethylene are, therefore, 67.5% and 8.8%, respectively, based on hexachloroethane.

Perchloroethylene and trichloroethylene in differing yields are likewise obtained when Examples 1 through 4 are repeated but substituting an equivalent molar amount of monoethanolamine in one series and of diethanolamine in another series in place of triethanolamine.

Example 5

A mixture of 937.5 g. of 1,1,2-trichloro-1,2,2-trifluoroethane (or, for brevity, sometimes designated as 1,1,2-trichlorotrifluoroethane), 1518 g. of triethanolamine and 5 g. of copper powder is agitated at room temperature (about 20°–30° C.) for 28 hours. An equal volume of cold water is then added to dissolve the crystals that form, and the volatile products are distilled out in a stream of air. On cooling the vapor-laden air to ice temperature, there is obtained 662 g. of a heavy, mobile, liquid product, which is found by gas-chromatographic analysis to contain 35.2% 1,2-dichloro-1,2,2-trifluoroethane, $CClF_2 \cdot CHClF$. The remainder is unreacted 1,1,2-trichlorotrifluoroethane (TCTFE). The conversion is, therefore, 30.5%; and the yield, based on TCTFE consumed, is 56.2%.

The product is dried over anhydrous calcium sulfate and fractionally distilled in an efficient column packed with glass helices. A fraction boiling at 30°–31° C. is collected, and its structure confirmed by infrared and mass-spectrometric analysis.

Identical products are obtained when an equivalent molar amount of any of the following amines is substituted for triethanolamine in the foregoing example: mono- and dimethylamines, di- and triethylamines, piperidine or morpholine.

Example 6

TEA and TCTFE are mixed in various proportions and shaken at room temperature for 20 hours in sealed glass bottles to which traces of copper powder previously have been added. The bottles are cooled to 0° C., opened and the contents treated with an excess of cold water. The heavy, mobile liquid which separates is washed with water until free from color. Gas-chromatographic analysis of this liquid indicates the presence of 1,2-dichloro-1,2,2-trifluoroethane (DCTFE) and unreacted TCTFE. No other volatile constituents are found. The results of seven such tests are given in the following table.

$CCl_2F \cdot CHClF$ is characterized by its boiling point (71°–73° C.; lit. 72.5 °C.), refractive index $$(n_D^{25} = 1.3923$$

lit. $n_D^{20} = 1.3942$), infrared and N.M.R. spectra. $CClF=CClF$ is a colorless liquid, B.P. 20.9° C.

Example 9

One mole (203.9 g.) of 1,1,1,2-tetrachloro-2,2-difluoroethane, 3 moles (447.6 g.) of TEA and 500 ml. of meth-

TABLE I

| Ex. No. | Amine/TCTFE mole ratio | Wt. of Amine (g.) | Wt. of TCTFE (g.) | Wt. of crude product (g.) | CHClF·CClF₂ in crude product (Percent) | Wt. CHClF·CClF₂ (g.) | Conversion (Percent) | TCTFE consumed (g.) | Yield (Percent) |
|---|---|---|---|---|---|---|---|---|---|
| 6-A | 6/1 | 159.4 | 33.3 | 2.7 | 75.2 | 2.0 | 7.4 | 32.6 | 7.5 |
| 6-B | 4/1 | 159.6 | 50 | 19.8 | 39.8 | 7.9 | 19.4 | 38.1 | 25.4 |
| 6-C | 2/1 | 119.4 | 75 | 56.6 | 33.7 | 19.1 | 31.2 | 37.5 | 62.4 |
| 6-D | 1.5/1 | 119.4 | 100 | 80.0 | 23.6 | 18.9 | 23.2 | 38.9 | 59.6 |
| 6-E | 1/1 | 79.6 | 100 | 80.7 | 16.8 | 13.6 | 16.7 | 32.9 | 50.7 |
| 6-F | 1/1.5 | 79.6 | 150 | 129.2 | 10.9 | 14.1 | 11.5 | 34.9 | 49.5 |
| 6-G | 1/2 | 79.6 | 200 | 179.0 | 10.1 | 18.1 | 11.1 | 39.1 | 56.8 |

Example 7

Pentachlorofluoroethane (83 g.; 0.377 mole) is mixed with 168.6 g. (1.130 moles) of TEA, 175 ml. of methanol and a trace of copper powder in a one-liter flask fitted with a stirrer and a reflux condenser. The mixture is gently heated to initiate the reaction which, once started, proceeds rapidly with considerable heat evolution. The outside of the flask is cooled with water until the reaction moderates. After one hour no further heat evolution or precipitation is evident. The mixture is stirred for two more hours, however, to ensure a complete reaction.

The mixture is shaken with an excess of cold water, whereupon a heavy, colorless, mobile liquid separates. This layer (53.2 g.) is run off and analyzed by gas chromatography with the following results:

Percent
$CCl_2F \cdot CHCl_2$ _____ 51.4
$CClF=CCl_2$ _____ 48.6

No $CCl_2FCCl_3$ is detected. The yield of $CCl_2FCHCl_2$ is, therefore, 39.0% and that of $CClF=CCl_2$ 45.9%, based on $CCl_2FCCl_3$.

$CCl_2FCHCl_2$ is identified by its boiling point (110°–117° C.; lit. 116.6° C.), refractive index ($n_D^{25} = 1.4465$; lit. $n_D^{20} = 1.4487$), infrared spectrum and nuclear magnetic resonance (N.M.R.) spectrum. $CClF=CCl_2$ is a colorless liquid boiling at 71° C.

Identical products are obtained when an equivalent molar amount of any of the following amines is substituted for TEA in the foregoing example: monoisopropylamine, trimethylamine, di-n-propylamine or hydrazine.

Example 8

1,1,2,2-tetrachloro - 1,2 - difluoroethane (203.9 g.; 1 mole) is added to 150 ml. of methanol and 298.4 g. (2 moles) of TEA in a one-liter flask fitted with a stirrer and reflux condenser. A trace of anhydrous cuprous chloride is added to initiate the reaction, which then proceeds with such vigor that the outside of the flask has to be cooled with water. The reaction is complete in about 2–3 hours, as judged by the rate of heat evolution. The reaction mixture is treated with an excess of cold water and steam distilled. There is obtained 131.3 g. of a heavy, colorless, mobile liquid which, by gas-chromatographic analysis, shows the following:

Percent
Unknown _____ 0.7
$CClF=CClF$ _____ 12.6
$CCl_2F \cdot CHClF$ _____ 65.9
$CCl_2F \cdot CCl_2F$ _____ 20.8

Based on $CCl_2F \cdot CCl_2F$ consumed, the yields of the two major products are:

Percent
$CCl_2F \cdot CHClF$ _____ 58.8
$CClF=CClF$ _____ 14.4 anol are mixed in a 2-liter flask fitted with a paddle stirrer and a reflux condenser. A trace of copper powder is added as a catalyst. In order to initiate the reaction, the mixture has to be heated. Once initiated, the reaction proceeds very vigorously, external cooling of the flask being necessary. The reaction appears to be complete in about 30 minutes. After allowing the reaction mass to stand for an additional hour, 1 liter of water is added and the resulting aqueous mass is steam distilled. A heavy, colorless, mobile liquid (119.5 g.) is obtained. Analysis of this liquid by gas chromatography shows the following:

Percent
$CClF_2 \cdot CHCl_2$ _____ 57.9
$CF_2=CCl_2$ _____ 42.1

No unreacted starting material is present. The yields of the two principal products, based on $CClF_2CCl_3$, are:

Percent
$CClF_2 \cdot CHCl_2$ _____ 40.9
$CF_2=CCl_2$ _____ 37.8

$CClF_2CHCl_2$ is characterized by its boiling point (71.0°–71.5° C.; lit. 71.9° C.), refractive index ($n_D^{25} = 1.3895$; lit. $n_D^{25} = 1.3889$), infrared and N.M.R. spectra. $CF_2=CCl_2$ boils at 15° C.

Example 10

A one-liter flask fitted with a paddle stirrer and a reflux condenser is charged with 163.7 g. (0.874 mole) of 1,1,1-trichloro-2,2,2-trifluoroethane, 260.7 g. (1.747 moles) of TEA and a trace of copper powder. The mixture is gently warmed to initiate the reaction which, once started, proceeds smoothly with the reflux condenser providing adequate cooling. After 5 hours an excess of water is added to dissolve the solid precipitate, and the mixture is steam distilled. The colorless, heavy liquid (109.0 g.) thereby obtained shows the following upon gas-chromatographic analysis:

Percent
$CHCl_2 \cdot CF_3$ _____ 97.3
$CCl_3 \cdot CF_3$ _____ 2.7

Hence the yield of $CHCl_2CF_3$, based on $CCl_3CF_3$ consumed, is 80.8%.

Careful fractionation provides a pure sample (B.P. 27.8°–28.1° C., lit. B.P. 27.1° C./747 mm.; $n_D^{25} = 1.3286$, lit. $n_D^{15} = 1.3332$), which is further characterized by its infrared and N.M.R. spectra.

Example 11

This example illustrates the preparation of

$CHF_2 \cdot CClF_2$ from $CClF_2 \cdot CClF_2$.

$CClF_2 \cdot CClF_2$ (0.55 mole) and TEA (1.04 moles) are placed in a stainless-steel bomb, provided with means for stirring, together with 1 g. of anhydrous cuprous chloride. The reaction mixture is stirred for 1½ hours at room temperature after which the temperature is raised to 100° C. and held there for an additional 1½ hours. A small amount of $CHF_2 \cdot CClF_2$ is formed.

Example 12

This example illustrates the preparation of $CF_3 \cdot CHClF$ from $CF_3 \cdot CCl_2F$. The apparatus employed is the same as that used in Example 11.

$CF_3 \cdot CCl_2F$ (0.59 mole) and TEA (1.17 moles) are mixed with 1 g. of anhydrous cuprous chloride in a stainless-steel bomb. After stirring for ½ hour at room temperature, a small amount of $CF_3 \cdot CHClF$ is detected by gas chromatography. The concentration of this monohydrogen compound increases to about 20% after 3 hours and to 26% after a total reaction time of 5 hours at room temperature. The concentration of the monohydrogen derivative is increased to about 30.4% by heating the reaction mass to 50° C. for 4½ hours. The structure $CF_3 \cdot CHClF$ is confirmed by mass-spectrometric analysis of a pure sample made by preparative gas chromatography.

Example 13

1,2-dibromo-1,1,2,2-tetrafluoroethane and piperidine in a mole ratio of 2:1 are mixed with a trace of anhydrous cuprous bromide and placed in a stainless-steel bomb, provided with means for stirring. After heating for 1–2 hours at about 100° C. a small amount of $CHF_2CBrF_2$ is formed.

Example 14

Morpholine and TCTFE are mixed in various proportions and allowed to stand at room temperature for several days, with occasional shaking, in sealed glass bottles to which traces of copper powder previously have been added. The bottles are cooled to 0° C., opened and the contents treated with an excess of cold water. The heavy, mobile liquid which separates is washed with water until free from color. Gas-chromatographic analysis of this liquid indicates the presence of 1,2-dichloro-1,2,2-trifluoroethane (DCTFE) and unreacted TCTFE. No other volatile constituents are found. The results of three such tests are given in Table II.

TABLE II

| Ex. No. | Amine/TCTFE mole ratio | Wt. of Amine (g.) | Wt. of TCTFE (g.) | Wt. of crude product (g.) | $CHClF \cdot CClF_2$ in crude product (Percent) |
|---|---|---|---|---|---|
| 14-A | 6/1 | 139.5 | 50 | 13.1 | 12.1 |
| 14-B | 4/1 | 139.5 | 75 | 15.2 | 804 |
| 14-C | 2/1 | 93.0 | 100 | 54.8 | 8.9 |

Example 15

One-half mole of $CF_3CCl_2CCl_2CF_3$ (a perhalogenobutane) is mixed with one mole of piperidine plus a trace of cuprous bromide powder. After shaking for a few minutes, an unexpectedly violent reaction occurs. The rate of heat evolution is so great that the reaction mixture has to be dowsed with an excess of cold water. Unreacted piperidine and the piperidine hydrochloride that is formed as a by-product are removed by washing with water, and the organic layer is subjected to steam distillation.

The organic layer in the resulting distillate is then resolved into its components by preparative-scale gas chromatography. The two components are unreacted $$CF_3CCl_2CCl_2CF_3$$

and $CF_3CCl=CClCF_3$. The latter compound, which is a chlorinated fluorinated butene, is identified by comparing its infrared spectrum with that given in the literature for this compound. Confirmation is provided by the N.M.R. spectrum which shows no hydrogen to be present. No $CF_3CHClCCl_2CF_3$ is found. However, the formation of copious amounts of piperidine hydrochloride indicates that the monohydrogen compound is first formed, and then is entirely dehydrochlorinated to $CF_3CCl=CClCF_3$ during the violently exothermic reaction that occurs. It would be expected that some of the monohydrogen derivative, $CF_3CHClCCl_2CF_3$, would be obtainable as such under controlled (i.e., milder) conditions of reaction.

It is not essential that the perhalogenoalkane used in practicing this invention be symmetrical in structure, as is the perhalogenobutane employed in the foregoing example. The structure of the halogenoalkane reactant can be unsymmetrical and have one or more asymmetric carbon atoms so long as the other aforementioned requisites of the starting halogenoalkane reactant are met. In this connection see the species of halogenoalkanes hereinbefore given by way of example.

Example 16

A mixture of $CF_2BrCFClBr$ (138 grams; 0.5 mole), piperidine (85 grams; 1.0 mole), n-heptane (250 ml.) and a trace of cuprous bromide powder is heated with vigorous stirring for from 3 to 4 hours at a temperature within the range of from 30° to 90° C. The reaction mixture is shaken several times with water to wash out the piperidine hydrobromide precipitate and any unreacted piperidine, and is then subjected to steam distillation. The organic layer in the distillate is roughly fractionated, and the lightest fraction is separated into its components by preparative-gas chromatography. In addition to n-heptane and unreacted $CF_2BrCFClBr$ there is separated a significant amount of $CF_2BrCFHCl$, which is identified by comparing its infrared spectrum with that given in the literature.

Example 17

Equal volumes of $CF_2BrCF_2Br$ and triethanolamine are admixed, together with a trace of cuprous bromide powder, and the mixture is heated to reflux temperature. After refluxing for one hour, a small amount of a fine, white, crystalline precipitate is observed. Enough methanol is added to bring the two liquids into a single liquid phase, after which the mixture is allowed to stand undisturbed at room temperature. Abundant precipitation occurs during the next hour. A portion of the precipitate is filtered, washed with methanol, and established by analysis to be triethanolamine hydrobromide. The reaction mass is allowed to stand for about 16 hours at room temperature, whereupon further precipitation occurs. Repeated washing with water yields a heavy, colorless liquid which is found by infrared analysis to be a mixture of the starting material and $CF_2BrCF_2H$.

Example 18

This example illustrates how compounds very closely related to those embraced by Formula I (including the definition of the various X's therein) are inoperative when an attempt is made to use them as a starting reactant in practicing the method of this invention.

A stainless-steel cylinder was charged with 0.32 mole of $CF_3CClF_2$, 0.64 mole of triethanolamine and 1 gram of anhydrous cuprous chloride. The cylinder was shaken on a mechanical shaker, and gas-phase samples were periodically withdrawn for analysis by gas chromatography. There was no evidence of reaction. After two weeks' shaking a gas-phase sample was analyzed by mass spectrometer. Only the starting material, $CF_3CClF_2$, was present.

From the foregoing examples it will be noted that, in generla, the more halogens other than fluorine, specifically the more chlorine atoms, in the molecule of the halogeno starting reactant the greater the reactivity. In particular, there is relatively little reactivity when there are only two chlorine atoms in the molecule and none with one unless a bromine atom is also present. In general, the effect of the amine is to abstract one halogen other than fluorine (said halogen being specifically chlorine) from the molecule and to replace it with hydrogen. In the case of the reaction of hexachloroethane with an amine, the presence of minor amounts of trichloroethylene in the product suggests that $CHCl_2CCl_3$ has been further reduced to $CHCl_2CHCl_2$ which then loses HCl. With this possible exception, no further reduction has ever been found. This indicates that the group $—CHCl_2$ is, in general, unreactive toward amines and that this lack of reactivity is transferred to the neighboring C atom. It will also be seen from a comparison of certain of the foregoing examples that, in general, reaction takes place on the carbon atom with the largest number of halogens other than fluorine, more particularly on the carbon atom with the largest number of chlorine atoms.

It will be understood, of course, by those skilled in the art that the present invention is not limited only to the use of the particular reactants and conditions of reaction given in the foregoing examples by way of illustration. Thus, instead of the particular reactants employed in the individual examples, one may use any other amine having a $pK_a$ value above 5.2 or any other halogenoalkane embraced by Formula I. Likewise, other catalysts may be used in lieu of, or in addition to, the particular catalysts employed in certain of the examples. Numerous examples of such catalysts have been given in a section of the specification prior to the examples.

The haloalkanes produced by the method of this invention are useful as, for example, chemical intermediates, fumigants, refrigerants, propellants, blowing agents, solvents, dry-cleaning agents, heat-exchange agents, as inert reaction media, in virus purification, as dielectric gases and in other applications where haloalkanes are now in common usage. Because of the specificity of the reaction, which is one of its unobvious and most remarkable features, it leads to products of exceptionally high purity. As a result, the fields of utility of the products of the method of the invention are materially enhanced.

I claim:
1. The method of abstracting halogen from a halogenoalkane represented by the formula

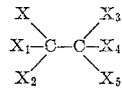

wherein X, $X_1$, $X_2$, $X_3$, $X_4$ and $X_5$ each represent a substituent selected from the group consisting of chlorine, bromine and fluorine atoms and perchloromethyl, perfluoromethyl and bromomethyl radicals, the total number of carbon atoms in the said halogenoalkane being not more than four, the bromine atoms when present in the substituents represented by the various X's being not more than one atom thereof on any one carbon atom and, when bromine is absent from the aforesaid substituents, the total halogen is comprised of at least two chlorine atoms and the remainder fluorine atoms, said method comprising bringing into reactive relationship (1) a halogenoalkane represented by the above formula and (2) an amine having a $pK_a$ value above 5.2.

2. A method as in claim 1 wherein the reactants of (1) and (2) are employed in a molar ratio of from about 0.01 to about 3 moles of the amine of (2) per mole of the halogenoalkane of (1).

3. A method as in claim 1 wherein the reactants of (1) and (2) are employed in a molar ratio of about 2 moles of the amine of (2) per mole of the halogenoalkane of (1).

4. A method as in claim 1 wherein the halogenoalkane is hexachloroethane.

5. A method as in claim 1 wherein the halogenoalkane is 1,1,2-trichloro-1,2,2-trifluoroethane.

6. A method as in claim 1 wherein the amine is an alkylamine.

7. A method as in claim 1 wherein the amine is an alkanolamine.

8. A method as in claim 1 wherein the amine is an ethanolamine.

9. A method as in claim 1 wherein the amine is morpholine.

10. A method as in claim 1 wherein the halogenoalkane of (1) contains not more than two carbon atoms.

11. A method as in claim 1 wherein the reactants of (1) and (2) are brought into reactive relationship in the presence of a catalyst for the reaction, said catalyst being at least one member of the group consisting of copper, silver, cobalt, tin, manganese, nickel, iron, molybdenum, chromium, antimony and vanadium, and salts of the said elements.

12. A method as in claim 11 wherein the reactants of (1) and (2) are brought into reactive relationship in the liquid phase and are employed in a molar ratio of from about 0.01 to about 3 moles of the amine of (2) per mole of the halogenoalkane of (1).

13. A method as in claim 11 wherein the catalyst is elementary copper.

14. A method as in claim 11 wherein the catalyst is a copper salt.

15. A method as in claim 14 wherein the copper salt is a copper salt of an inorganic acid.

16. A method as in claim 14 wherein the copper salt is a copper chloride.

17. The method of producing perchloroethylene which comprises bringing hexachloroethane into reactive relationship with an amine having a $pK_a$ value of at least about 7.0 in a molar ratio of from about 0.01 to about 3 moles of the said amine per mole of hexachloroethane; and isolating perchloroethylene from the resulting reaction mass.

18. A method as in claim 17 wherein the amine is triethanolamine.

19. The method of converting $CClF_2 \cdot CCl_2F$ to $CClF_2 \cdot CHClF$ which comprises bringing $CClF_2 \cdot CCl_2F$ into reactive relationship with an amine having a $pK_a$ value of at least about 7.0 in a molar ratio of from about 0.01 to about 3 moles of the said amine per mole of $CClF_2 \cdot CCl_2F$; and isolating $CClF_2 \cdot CHClF$ from the resulting reaction mass.

20. A method as in claim 19 wherein the amine is triethanolamine.

References Cited

Tarrant et al.: J. Am. Chem. Soc., 76, 2343–2345 (1954).

Tarrant et al.: J. Am. Chem. Soc., 76, 3466–3467 (1954).

Tarrant et al.: J. Am. Chem. Soc., 77, 2783–2787 (1955).

DANIEL D. HORWITZ, *Primary Examiner.*